United States Patent [19]

Maska et al.

[11] Patent Number: 5,252,669
[45] Date of Patent: Oct. 12, 1993

[54] GRAFTED, THERMOPLASTIC, WATERBORNE POLYMER AND COATING COMPOSITION

[75] Inventors: Rudolf Maska, Indiana Township, Allegheny County, Pa.; Marvin T. Tetenbaum, Melbourne, Fla.; James R. Bodwell, West Chester; David C. Kapp, Richland Township, Allegheny County, both of Pa.

[73] Assignee: PPG Industries, Inc., Pittsburgh, Pa.

[21] Appl. No.: 810,060

[22] Filed: Dec. 19, 1991

[51] Int. Cl.⁵ .............................. C08L 63/10
[52] U.S. Cl. .................... 525/112; 525/65; 525/115
[58] Field of Search .............. 525/65, 112, 115

[56] References Cited

U.S. PATENT DOCUMENTS

| | | |
|---|---|---|
| 4,212,781 | 7/1980 | Evans et al. . |
| 4,487,860 | 12/1984 | Winner et al. . |
| 4,487,861 | 12/1984 | Winner . |
| 4,503,173 | 3/1985 | Martino et al. . |
| 4,522,961 | 6/1985 | Martino et al. . |
| 4,600,737 | 7/1986 | Georgalas et al. ............... 523/414 |
| 4,600,754 | 7/1986 | Winner ........................... 525/531 |
| 4,600,754 | 7/1986 | Winner . |
| 4,847,410 | 7/1989 | Lickei et al. ................... 562/583 |

*Primary Examiner*—Melvyn I. Marquis
*Assistant Examiner*—D. Aylward
*Attorney, Agent, or Firm*—Dennis G. Millman

[57] ABSTRACT

A water reducible resin for use in a coating composition is produced by grafting in organic solvent a thermoplastic polymer onto a thermosetting polymer that has been copolymerized with acid group-containing monomers to render the resultant polymer water soluble. Thermoplastic polymer is also grafted onto a phosphatized polyepoxide for the sake of adhesion of a coating to a substrate. A film formed from a waterborne coating composition containing the grafted polymers as a binder has both the toughness properties characteristic of a thermoplastic and the flexibility properties of a thermosetting resin.

11 Claims, No Drawings

GRAFTED, THERMOPLASTIC, WATERBORNE POLYMER AND COATING COMPOSITION

BACKGROUND OF THE INVENTION

This invention relates to a novel resin that may be used as a binder in water reducible coating compositions to provide a unique combination of film toughness and flexibility. The invention also includes coating compositions containing the resin. This type of coating composition is particularly useful for coating metal substrates such as metal food and beverage cans.

Polymers of ethylenically unsaturated monomers typically form thermoplastic polymers that are characterized by toughness, but which produce unsuitably brittle films. It is known to offset the brittleness by adding plasticizers, but the improved film flexibility is often at the expense of some of the toughness. These thermoplastic polymers of ethylenically unsaturated monomers sometimes have relatively high glass transition temperatures ($T_g$), and for some coating applications it is desirable to provide the property of high $T_g$ in the binder resin. Therefore it would be desirable for a number of reasons to include more of a thermoplastic component in some coatings.

In addition to the drawback of brittleness, another problem with incorporating thermoplastics into coating compositions is the difficulty of solubilizing substantial amounts of the thermoplastic polymers in aqueous medium. Since waterborne coating compositions are becoming increasingly desirable for environmental reasons, it would be very advantageous to be able to include thermoplastic polymers in waterborne compositions. It has been proposed to copolymerize ethylenically unsaturated monomers with solubilizable groups so as to yield water reducible copolymers, but the resulting copolymers are generally not thermoplastic in nature.

SUMMARY OF THE INVENTION

The present invention provides a substantial thermoplastic component in a water reducible coating composition by grafting a thermoplastic polymer onto a thermosetting polymer that has been copolymerized with acid group containing monomers to render the polymer water soluble. The polymerization of the thermoplastic polymer and the grafting step both take place in organic solvent, and thereafter the grafted polymer is neutralized and reduced with water. The resulting film formed from the coating composition has both the toughness properties characteristic of a thermoplastic and the flexibility properties of a thermosetting resin. The thermoplastic polymer is a copolymer of ethylenically unsaturated monomers, particularly those with alpha-beta unsaturation such as vinyl monomer and acrylic monomers, and a grafting agent capable of reacting with the ethylenic unsaturation of the thermoplastic monomers and with active curing sites on the thermosetting polymer, in particular with active hydrogens in the acid groups. Typically the curing agent contains alpha-beta unsaturation and a reactive group such as a glycidyl group or an isocyanate group. Another feature of the present invention is the inclusion of a phosphated epoxy polymer as a second thermosetting polymer to which the thermoplastic polymer may be grafted. The phosphated epoxy serves to provide good adhesion of the coating to a substrate as well as providing additional sites onto which the thermoplastic polymer may be grafted.

DETAILED DESCRIPTION OF THE INVENTION

The thermosetting intermediate polymers useful herein may be prepared by free radical-initiated addition polymerization of ethylenically unsaturated monomers, at least one of which contains an acid group, in a solvent medium. Typically the thermosetting polymer may be an acrylic polymer.

The acid-functional monomers useful for synthesizing the thermosetting polymer are preferably alpha, beta-ethylenically unsaturated carboxylic acids. The acid-functional monomer is copolymerized with other monomers as described hereinbelow. Examples of suitable alpha, beta-ethylenically unsaturated carboxylic acids are those containing from 3 to 8 carbon atoms such as acrylic acid, methacrylic acid, itaconic acid, maleic acid, fumaric acid, mono-esters of unsaturated dicarboxylic acids, e.g., monomethyl maleate and monoethyl fumarate as well as anhydrides of the corresponding acids where they exist, can also be used. Acrylic and methacrylic acids are preferred. Other acid-functional monomers, such as sulfonic acids, e.g., sulfoethyl methacrylate, 2-acrylamido 2-methylpropane sulfonic acid, may be useful for this purpose as well. To provide sufficient acid functionality for water solubilization after the step of grafting thermoplastic polymer onto the acid-functional thermosetting polymer, the acid-functional monomers preferably constitute about 5 to 30 percent on a weight basis of the monomers used to polymerize the acid-functional thermosetting polymer.

The other polymerizable monomers for polymerizing the thermosetting intermediate of the present invention may be selected from a wide variety of materials depending upon the properties desired. For example, at least a portion of the other copolymerizable monomer can be vinyl compound such as ethylene or propylene, a vinyl aromatic compound such as styrene, tertiary butylstyrene, vinyltoluene and vinylxylene. Such monomers are preferred because of their good water and pasteurization resistance. Other monomers which are useful herein are the alkyl esters of methacrylic acid which contain from 1 to 3 carbon atoms in the alkyl group. Specific examples of such esters are methyl methacrylate and ethyl methacrylate. Monomers which can be used and which provide flexibility to the coating are the alkyl esters of acrylic acid having from 2 to 12 carbon atoms in the alkyl group and alkyl esters of methacrylic acid having from 4 to 12 carbon atoms in the alkyl group. Examples of monomers of this type are ethyl acrylate, propyl acrylate, butyl acrylate, hexyl acrylate, 2-ethylhexyl acrylate, butyl methacrylate, and 2-ethylhexyl methacrylate. Other monomers which can be useful herein are copolymerizable monomers containing an epoxy group. Examples thereof can be glycidyl acrylate, glycidyl methacrylate, allyl glycidyl ether and the like.

Also useful herein can be ethylenically unsaturated monomers containing N-(alkoxyalkyl)amides. Examples thereof are N-(alkoxymethyl)acrylamides and N-(alkoxymethyl)methacrylamides having 1 to 4 carbon atoms in the alkoxy group. N-methylolacrylamide and N-(methylol)methacrylamide can also be used.

Other monomers which may be used in polymerizing the thermosetting intermediate include the vinyl halides, vinylidene halides, vinyl versatate, vinyl acetate, dialkyl fumarate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers can be used.

The acid-functional thermosetting polymer described above can be prepared by free-radical initiated polymerization of a mixture of the copolymerizable monomers by solution polymerization techniques. Usually, the monomers are dissolved in a solvent or a mixture of solvents and polymerized until the free monomeric content is reduced, preferably to below about 0.1 percent. Examples of free radical initiators include azobis-(alpha-gamma)-dimethylvaleronitrile, tertiary butyl perbenzoate, tertiary butyl peracetate and benzoyl peroxide.

Solvents which can be used in the polymerization of the acid-functional thermosetting polymer include alcohols such as ethanol, n-butanol, tertiary butanol, tertiary amyl alcohol; ketones such as acetone, methyl ethyl ketone; and ethers such as the dimethyl ether of ethylene glycol and alcohol ethers such as Cellosolve ® solvent from Union Carbide. To reduce the volatile organic content of the composition, one may optionally replace a portion of the solvent with a low viscosity monomer that can subsequently be incorporated into the coating without detrimentally affecting the properties of the coating. Relatively low molecular weight polyols can serve this purpose. Usually, the solvent is first heated to reflux and a mixture of the monomers and the free radical initiator are added simultaneously and slowly to the refluxing solvent. An additional catalyst is optionally added and the reaction mixture is held at polymerizing temperatures so as to reduce the free monomer content of the reaction mixture.

The acid-functional thermosetting polymers useful herein typically have a weight average molecular weight of 5,000 to 100,000, preferably 10,000 to 50,000.

Other acid group-containing thermosetting polymers, preferably having acid values of about 20 to 750, which are compatible with the phosphated epoxy resin described herein are also encompassed hereby.

It has been found to be highly beneficial for the sake of adhesion of the coating to a substrate to include a second thermoplastic polymer in the composition of the present invention, that being a phosphated epoxy polymer. The phosphated epoxy polymers useful herein are prepared by reacting phosphoric acid or an equivalent thereof with an epoxide compound or mixture having more than 1.0 glycidyl groups per molecule. For polymerization, some polyepoxide such as a diepoxide must be present, but some monoepoxide may be present in a mixture. Polyepoxides as are generally known in the art are suitable for use in the present invention, examples of which can be found in "Handbook of Epoxy Resins," Lee and Neville, 1967, McGraw-Hill Book Company. In the reaction between the polyepoxide and the phosphoric acid, an epoxy group reacts with a hydroxyl group on the phosphoric acid, leaving at least one hydroxyl group on the phosphoric acid as a grafting site for the thermoplastic polymer in a subsequent step. Preferably, the resultant phosphated epoxy polymer is substantially free of an epoxy group and is ungelled. It has a molecular weight of 400 to 21,000.

A preferred class of polyepoxides are the polyglycidyl ethers of polyphenols, such as bisphenol A. They are produced by etherification of a phenolic compound with epichlorohydrin in the presence of an alkali. The phenolic compound can be 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are similar polyglycidyl ethers of polyhydric alcohols which are derived from such polyhydric alcohols as ethylene glycol, diethylene glycol, 1,5-pentanediol, 1,2,6-hexanetriol, glycerol, and 2,2-bis(4-hydroxycyclohexyl)propane.

Another useful class of polyepoxides are those containing oxyalkylene groups in the epoxy molecule. Such oxyalkylene groups are typically groups of the general formula:

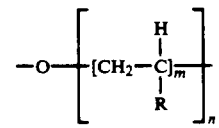

wherein R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

In addition to the polyepoxide resins described above, addition polymerization polymers containing pendent epoxy groups can also be utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols, preferably containing from 1 to 8 carbon atoms and the monovinyl aromatic monomers of the benzene class, e.g., styrene and vinyl toluene.

Hydantoin-based polyepoxide resins as described in U.S. Pat. No. 4,110,287, issued Aug. 29, 1978 to Bosso and Castellucci, and in an article in Die Angewandte Makromolekulare Chemie, by Jurgen Habermeier, Vol. 63, (1977), pages 63 to 104 (the disclosures of which are hereby incorporated by reference), can also be used. The preferred polyepoxide resin has an epoxy equivalent of about 170 to 5000 and preferably 180 to 500.

As indicated above, the polyepoxide resin is reacted with a phosphoric acid. The phosphoric acid can be a 100 percent orthophosphoric acid, superphosphoric acid or the aqueous solutions thereof such as 85 percent phosphoric acid aqueous solution. Other forms of the phosphoric acid and triphosphoric acid can be used. Also, the polymeric or partial anhydrides of the phosphoric acids can be used. Typically used are aqueous phosphoric acids which are about 70 to 90 percent and preferably about 85 percent phosphoric acid. The ratio of reactants is about 0.1 to 1 equivalent, preferably 0.1 to 0.5 equivalent, of phosphoric acid per equivalent of an epoxy group.

A solvent or mixture of solvents is preferably employed in the reaction of the epoxy resin and phosphoric acid for the purpose of achieving better reaction control. A non-reactive solvent can be used, examples of which include the ketones, ethers, alcohols, and ether alcohols. Specific examples of suitable solvents are methyl ethyl ketone, methyl butyl ketone, ethanol, propanol, isopropanol, butanol, butoxyethanol, and diethylene glycol monobutyl ether. It is advantageous for the solvent to include at least one alcohol.

The thermoplastic polymer, which in the present invention is grafted onto the thermosetting polymer(s) described above, may be the polymerization product of ethylenically unsaturated monomers such as vinyls and-/or acrylates selected from substantially the same list of unsaturated monomers described above in connection with the polymerization of the thermoplastic intermediate polymer. However, characteristic of the thermoplastic polymer is the absence of water solubilizing groups and the absence of thermosetting curing sites. Thus, the thermoplastic polymer is substantially free of acid groups, hydroxyl groups, glycidyl groups, and any groups that could react with a curing agent to cure by a thermosetting mechanism. A preferred example of an ethylenically unsaturated monomer for use in the thermoplastic polymer is styrene.

In order to permit the thermoplastic polymer to be grafted onto the thermosetting polymer, there is copolymerized into the thermoplastic polymer a grafting agent that is capable of both copolymerizing with the unsaturated monomer during polymerization of the thermoplastic polymer and reacting with an active hydrogen on the thermosetting polymer. The active hydrogen grafting site on the acid-functional thermosetting polymer is believed to be a portion of the carboxyl groups, and on the phosphatized epoxy it is believed to be the remaining hydroxyl group of the phosphoric acid group. An example of a suitable grafting agent is glycidyl methacrylate. Isocyanate containing acrylates may also serve as grafting agents. Ideally, the molar ratio of grafting agent to thermoplastic polymer is about 1:1, but considerable variation is possible, e.g., as low as about 0.5:1 and as high as 2:1. Low amounts of grafting agent may leave unduly large amounts of ungrafted thermoplastic polymer in the composition. High amounts of grafting agent may increase the occurrence of multiple grafts of individual thermoplstic polymers to more than one thermsetting polymer, thereby undesirably reducing the flexibility of the resulting film. By way of example, in the case of a thermplastic consisting essentially of styrene copolymerized with glycidyl methacrylate, the glycidyl methacrylate may consititute about 0.3 to 10, preferably 0.5 to 3, percent by weight of the total of styrene and glycidyl methacrylate. The resulting thermoplastic polymer is substantially linear and of considerable length, thereby exhibiting the characteristics of a thermoplastic polymer. The thermoplastic polymer is at least ten, preferably at least 100, monomer units in length. In terms of molecular weight, the thermoplastic polymer may have a molecular weight of at least 1000, preferably at least 10,000. In the example of styrene polymerized with glycidyl methacrylate, a preferred molecular weight is about 20,000. The particular molecular weight of the thermoplastic polymer chosen depends upon the amount of flexibility required for a specific application. In general, the longer the length of the thermoplastic polymer, the greater is the flexibility of the film produced by the coating composition of the present invention. In addition to the length of the thermoplastic polymer, flexibility is also influenced by the amount of the thermoplastic material that is grafted into the final polymer. Unduly long thermoplatic polymer lengths, however, may be disadvantageous due to increased viscosity and the resulting need for larger amounts of organic solvent. Therefore, molecular weights greater than 100,000 are generally avoided for the thermoplastic polymer.

The thermoplastic polymer component is additionally advantageous for providing the option to impart high $T_g$ characteristics to a flexible resin system. Heretofore, it was generally considered that flexible films were characterized by low $T_g$, and that hard films were characterized by high $T_g$. However, by selecting a thermoplastic polymer with a high $T_g$ for use as the grafted thermoplastic component of the present invention, the hardness of a high $T_g$ material can be attained without sacrificing flexibility. High $T_g$ for the purposes of the present invention may be considered to be $T_g$ of at least 50° C. Styrene as used in the example has a $T_g$ of about 100° C. $T_g$ as high as 150° C. may be suitable for coating compositions of this type.

The thermoplastic polymer may be polymerized separately and then grafted onto the thermosetting polymers, or the polymerization of the thermoplastic polymer may take place in the presence of the thermosetting polymers, in which case the grafting takes place in the same step. The latter is preferred. On the basis of weight of resin solids of the three polymers, preferred embodiments include the combination of 10 to 70 percent (preferably 30 to 60 percent) of the thermoplastic polymer, 10 to 27 percent of the acid-functional thermosetting polymer, and 3 to 30 percent of the phosphatized polyepoxide. The proportion of the acid-functional thermosetting polymer to the phosphatized polyepoxide may range from 4:1 to 1:2 (preferably 3:1 to 1:1) on a weight basis of resin solids. Considerably more phosphatized polyepoxide could theoretically be included in the combiination, e.g., up to a ratio of about 1:10, but there little advantage in doing so. The polymerization of the thermoplastic resin and the grafting step are carried out in organic solvent of the same type set forth above.

The resultant grafted polymer includes a substantially linear, thermoplastic chain of substantial length, thereby exhibiting at least some of the characteristics of a thermoplastic polymer. At the same time, the grafted polymer includes substantial acid functionality in the non-thermoplastic portions of the polymer, thereby permitting it to be water solubilized by at least partial neutralization with a base. The base is preferably a fugitive base such as ammonia and primary, secondary or tertiary amines, e.g., ethanolamine, diethanolamine, N-methylethanolamine, N,N-dimethylethanolamine; isopropanolamine, diisopropanolamine, methylamine, ethylamine, diethylamine, trimethylamine, triethylamine and morpholine.

In the practice of this invention as a coating composition, the polymer and a curing agent such as an aminoplast or phenoplast resin or an isocyanate including blocked isocyanates can be employed in amounts sufficient to cure the coating composition. Generally, the thermoplastic copolymer is employed in amounts of about 5 to 75 percent by weight, and preferably about 30 to 60 percent by weight based on total resin solids of the coating composition. The aminoplast or phenoplast is employed in amounts of about 5 to 65 percent and preferably about 10 to 15 percent by weight based on the total resin solids of the composition.

Aminoplast resins are the condensation products of an aldehyde, e.g., formaldehyde, acetaldehyde, crotonaldehyde, and benzaldehyde with an amino- or amide group-containing substance, e.g., urea, melamine, and benzoguanamine. Products obtained from the reaction of alcohols and formaldehydes with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tert-amylphenol and cyclopentylphenol. The methylolphenol ethers described in U.S. Pat. No. 2,597,330 (herein incorporated by reference) are especially useful.

A number of blocked polyisocyanates are satisfactory crosslinking agents. These agents are well known in the art. Generally, the organic polyisocyanates are blocked with a volatile alcohol, epsiloncaprolactam or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216 to 217, contains a description of many blocked isocyanates that can be used here (the disclosure of this publication is herein incorporated by reference).

Also contained in the coating composition can be additives such as pigments, flow control agents, adhesion promoters, cure catalysts and the like. The coating compositions of this invention can be prepared by thoroughly blending the latex polymer, the curing agent, and other coating additives. Typically, resinous adjuncts such as polyester polyols, polyether polyols, alkyds and functional acrylic polymers are employed therewith. The resinous adjuncts are selected on the basis of cost and properties such as flow, viscosity and the like. It is a distinct feature of the invention that the latex polymers of this invention, in their own right, provide improvement in flow properties and exhibit good adhesion properties. Nonetheless, the latex polymers can be used with flow control agents such as polyesters, e.g., KELSOL 529-B-75, available from Spencer Kellog Co., adhesion promoters such as epoxy resins, e.g., EPON 828, available from Shell Chemical Co., and the like, which are employed in coating applications. These and other additives are within the purview of one skilled in the art.

The coating composition can be applied directly to substrates such as aluminum, steel or the like by means such as direct or reverse roll coating or spraying. The coated substrates are cured by, say, baking to a temperature sufficient to effect such a cure. Typically the coated substrates are baked at peak metal temperatures of about 350° F. (177° C.) to 400° F. (204° C.) to provide hard films.

The cured coatings have good film integrity in that they have good pencil hardnessm and good solvent resistance which can be evaluated by methyl ethyl ketone double-rubs with a cloth which has been wet with methyl ethyl ketone and used to rub across the surface of the cured coating until the integrity of the film is affected.

These and other aspects of the invention are further illustrated by the following non-limiting examples.

Example 1 describes synthesis of a phosphatized polyepoxide intermediate for use in the present invention.

EXAMPLE 1

To a round bottom flask, equipped with stirrer, condenser, thermometer, and a cylinder to meter additions, was added 384.3 grams of 85% phosphoric acid and 180.0 grams of butyl Cellosolve ®. The contents were heated to 110° C. At this temperature addition was made of 1890 grams. of EPON 828 premixed with 630 grams. of butyl Cellosolve ® over 1¼ hours. The reaction exothermed to 123° C. then cooled down to 112° C. The contents were held at 112°-115° C. for 30 minutes and cooled. This product was analyzed to contain 77.9% total solids (two hours at 150° C.), viscosity Z9+ Gardner Holdt tube, and 1.803 milliequivalents acid.

Example 2 describes synthesis of an acid-functional acrylic polymer intermediate for use in the present invention.

EXAMPLE 2

A five liter round bottom flask was equipped with heating mantle, stirrer, thermometer, condenser, and two cylinders to meter additions. To this flask were added at room temperature 807.8 grams of bisphenol A polyol (a reaction product of one mole of bisphenol A and 7 moles of ethylene oxide) and 816.0 grams of n-butyl alcohol. The contents were heated to 118° C. in nitrogen atmosphere. At 118° C. (reflux) the nitrogen was turned off, then acrylic monomers and initiator were added over 3 hours as two steams with uniform rates. The acrylic monomers consisted of 706.9 grams of styrene, 706.9 grams of butyl acrylate, 605.9 grams of acrylic acid, and 40.5 grams of t-dodecylmercaptan as chain transferring agent. The initiator consisted of 80.8 grams of t-butylperbenzoate diluted with 170.0 grams of n-butanol. When the additions were completed 10.1 grams of t-butylperbenzoate and 10.1 grams of n-butanol were added and held for one hours at 118°-121° C., then cooled. The product analyzed to be:

72.6% total solids (1 hours at 110° C.)
1.971 milliequivalents acid
23,000 centipoises viscosity #6 spindle and 20 RPM
17,735 weight average molecular weight.

Example 3 describes the simultaneous polymerization of a thermoplastic polymer and its grafting onto the phosphatized polyepoxide of Example 1 and the acid-functional acrylic polymer of Example 2, thereby yielding the resin of the present invention, which is then neutralized and reduced with water.

EXAMPLE 3

To a five liter flask equipped as in Example 2 was added 346.6 grams of the phosphatized polyepoxide product from Example 1, 746.9 grams of the acid-functional acrylic polymer product from Example 2, and 218.2 grams of n-butanol. The contents were heated to 118° C. in a nitrogen atmosphere. At 118° C. the nitrogen was turned off and monomers and initiator were added over 3 hours as 2 streams with uniform rates. The monomers consisted of: 669.3 grams of styrene and 20.7 grams of glycidyl methacrylate. The initiator consisted of 13.8 grams t-butylperbenzoate and 35.0 grams of n-butyl alcohol. When the additions were completed, 3.5 grams of t-butylperbenzoate and 5 grams of n-butanol were added and held at 117° C. for 2 hours. The contents were cooled to 99° C. and 183.5 grams of dimethylethanolamine was added over 15 minutes and held for 15 minutes between 95°–99° C. This was followed by an addition of 2000 grams of deionized water over 1.5 hours, heated to 75° C. The contents were heated for 2 hours at 70°–72° C. with 3.9 grams 70% active t-butyl hydroperoxide and 2.7 isoascorbic acid to eliminate free styrene. Then the contents were held at 74° C. for 2 hours and cooled. This product analyzed to be:

35.8% total solids (1 hour at 110° C.)
0.398 milliequivalents acid
0.515 milliequivalents base
570 centipoises Brookfield Viscosity 8.9 pH.

Example 4 illustrates a can coating formulating using the resin of the present invention, and describes performance testing of the resulting film.

EXAMPLE 4

A pigment paste was prepared by dispersing 51.4 parts by weight of a waterborne acrylic grind vehicle resin (polymerized from acrylic acid and methyl methacrylate) and 143.1 parts by weight titanium dioxide in a high speed mixer, then adding 31.5 parts by weight water. To the pigment paste was added a blend of 231.3 parts by weight of the dispersed resin of Example 3, 33.8 parts by weight of a benzoguanamine crosslinking agent ("Cymel 1123" from American Cyanamide), and 10.3 parts by weight wax or wax blend (for film lubricity). This coating composition was applied by drawdown with a wire wound bar to an aluminum panel and cured in a 400° F. gas oven. The resulting film was hard, passing a 4H pencil test, passed twenty solvent rubs with methyl ethyl ketone without coating failure to substrate, and possessed a gloss reading of 83 as measured on a 60° meter. Process testing was carried out in steam for twenty minutes under fifteen pounds pressure. Another panel coated with commercial, waterborne, white coating composition based on a conventional, thermoset, non-grafted, acrylic resin (polymerized from acrylic acid and other acrylate monomers including methyl methacrylate), after being subjected to the same steam test, was found to be blistered, heavily water spotted, and lacking in gloss. In contrast thereto, the composition containing the grafted resin of the present invention was unaffected and maintained its smooth, glossy appearance.

We claim:

1. A resin adapted for use in a waterborne coating composition comprising a mixture of:
   (a) a thermosetting polymer having at least 5 percent by weight acid groups, and
   (b) a phosphatized epoxy polymer; both of which have grafted thereon a polymeric segment that is essentially thermoplastic in nature in that it is essentially free of thermosetting curing sites.

2. The resin of claim 1 wherein the thermoplastic polymeric segment is essentially free of acid groups and hydroxyl groups.

3. The resin of claim 1 wherein the thermoplastic polymeric segment has a molecular weight of at least 1000.

4. The resin of claim 1 wherein the thermoplastic polymeric segment is the reaction product of alpha-beta ethylenically unsaturated monomers.

5. The resin of claim 4 wherein the ethylenically unsaturated monomers include vinyl monomers.

6. The resin of claim 5 wherein the ethylenically unsaturated monomers include styrene.

7. The resin of claim 1 wherein the thermoplastic polymer segment is grafted onto said thermosetting polymer and said phosphatized epoxy polymer by means of a grafting agent having a first reaction site for copolymerizing with the thermoplastic polymer segment and a second reaction site for reacting with acid groups on the thermosetting polymer.

8. The resin of claim 7 wherein the grafting agent includes alpha-beta unsaturation and at least one glycidyl group or isocyanate group.

9. The resin of claim 8 wherein the grafting agent comprises glycidyl methacrylate.

10. The resin of claim 1 comprising, on a weight basis of resin solids, 10 to 70 percent of the thermoplastic polymer, 10 to 27 percent of the thermosetting polymer segment, and 3 to 20 percent of the phosphatized polyepoxide.

11. The resin of claim 10 comprising 30 to 60 percent of the thermoplastic polymer on a weight basis of resin solids.

* * * * *